(12) United States Patent
Stauder et al.

(10) Patent No.: US 6,532,909 B2
(45) Date of Patent: Mar. 18, 2003

(54) LOW RAM AIR RESISTANCE COOLING MODULE WITH AUTOMATIC FLAPPER DOOR ACTUATION

(75) Inventors: Frank Stauder, London (CA); John Makaran, London (CA); Andrew Lakerdas, London (CA)

(73) Assignee: Siemens Automotive Inc., Mississauga (CA)

( * ) Notice: Subject to any disclaimer, the term of this patent is extended or adjusted under 35 U.S.C. 154(b) by 0 days.

(21) Appl. No.: 09/813,330

(22) Filed: Mar. 20, 2001

(65) Prior Publication Data

US 2002/0170507 A1 Nov. 21, 2002

(51) Int. Cl.[7] .................................................. F01P 7/02
(52) U.S. Cl. .................................. 123/41.04; 123/41.12
(58) Field of Search ............................ 123/41.04, 41.12

(56) References Cited

U.S. PATENT DOCUMENTS

| | | |
|---|---|---|
| 2,289,616 A | 7/1942 | Wojcik |
| 2,352,058 A | 6/1944 | Wood et al. |
| 2,482,461 A | 9/1949 | Browne et al. |
| 3,697,838 A | 10/1972 | New ............................ 318/135 |
| 3,854,459 A | 12/1974 | Stimeling ..................... 165/39 |
| 3,891,907 A | 6/1975 | Lenzkes et al. .............. 318/369 |
| 4,313,561 A | 2/1982 | Kenny ......................... 237/12.3 |
| 4,429,666 A | 2/1984 | Surace et al. .................. 123/41 |
| 4,476,820 A | 10/1984 | Nixon ...................... 123/41.05 |
| 4,534,506 A | 8/1985 | Ishida et al. ............... 236/35.3 |
| 4,666,144 A | 5/1987 | Silverberg .................. 271/270 |
| 4,753,288 A | 6/1988 | Harvey ........................ 165/98 |
| 4,779,577 A | 10/1988 | Ritter et al. ............. 123/41.05 |
| 5,072,544 A | 12/1991 | Breck, Jr. ..................... 49/264 |
| 5,205,484 A * | 4/1993 | Susa et al. .................. 236/35.3 |
| 5,215,044 A | 6/1993 | Banzhaf et al. .......... 123/41.29 |
| 5,293,551 A | 3/1994 | Perkins et al. .............. 361/154 |
| 5,566,745 A * | 10/1996 | Hill et al. .................... 165/299 |
| 5,610,492 A | 3/1997 | Leung et al. ................ 318/701 |
| 5,660,195 A | 8/1997 | Taylor, Jr. et al. ............ 134/58 |
| 5,675,098 A | 10/1997 | Hobbs ........................ 73/865.6 |
| 5,709,103 A | 1/1998 | Williams ...................... 62/402 |
| 5,723,918 A | 3/1998 | Schilling et al. .............. 310/37 |
| 5,732,666 A | 3/1998 | Lee .......................... 123/41.05 |
| 5,901,786 A | 5/1999 | Patel et al. ................. 165/283 |
| 5,925,954 A | 7/1999 | Gillieron ...................... 310/89 |
| 5,927,380 A | 7/1999 | Scoccia ..................... 165/11.1 |
| 5,990,586 A | 11/1999 | Milano, Jr. .................. 310/75 |

* cited by examiner

*Primary Examiner*—Tony M. Argenbright
*Assistant Examiner*—Katrina B. Harris

(57) ABSTRACT

An engine cooling module 10 includes a shroud 12 having at least one fan opening 15 and at least one additional opening 18 in the wall generally adjacent to the fan opening to permit air to pass though the shroud 12. A fan 14 is coupled to the shroud to permit air moved by the fan to pass through the shroud 12. An electric motor drives the fan. Closure structure 20 is movable to prevent and permit air flow through the additional opening 18. An actuator 28 moves the closure structure 20 from a closed position, covering the additional opening 18, to an opened position, uncovering the additional opening 18. A sensor 34 detects ram air at the shroud 12. A controller 32 receives a signal from the sensor 34 indicating the initial presence of ram air and, in response thereto, sends a signal to the actuator 28 to move the closure structure 20 to the opened position.

30 Claims, 7 Drawing Sheets

LOW RAM AIR RESISTANCE COOLING MODULE WITH AUTOMATIC FLAPPER DOOR ACTUATION

FIELD OF THE INVENTION

The invention generally relates to engine cooling modules having axial flow fan designs to cool a radiator and, more particularly, to a cooling module which reduces electric motor energy draw requirements by minimizing energy need to bring design cooling flow rates through the radiator.

BACKGROUND OF THE INVENTION

An axial flow fan may be used to produce a flow of cooling air through the heat exchanger components of a vehicle. For example, a an engine cooling module used in an automotive cooling application may include an electric motor driven axial flow fan for moving cooling air through a liquid-to-air heat exchanger such as an engine radiator, condenser, intercooler, or combination thereof to cool the engine.

Operating the electric motor to drive the fan to cool the radiator consumes significant electrical energy, and thus fuel when operating a vehicle.

There is a need to reduce the energy draw of the electric motor of an engine cooling module and thus reduce the fuel consumed in operating a vehicle.

SUMMARY OF THE INVENTION

An object of the invention is to fulfill the need referred to above. In accordance with the principles of the present invention, this objective is achieved by providing an engine cooling module which includes a shroud having at least one fan opening in a wall thereof, and at least one additional opening in the wall generally adjacent to the fan opening to permit air to pass though the shroud. A fan is coupled to the shroud so as to be adjacent to the fan opening to permit air moved by the fan to pass through the shroud. An electric motor drives the fan. Closure structure is associated with the additional opening and is movable to prevent and permit air flow through the additional opening. An actuator is constructed and arranged to actuate the closure structure to move the closure structure from a closed position, covering the additional opening, to an opened position, substantially uncovering the additional opening. A sensor is constructed and arranged to detect ram air at the shroud. A controller is constructed and arranged to receive a signal from the sensor indicating the initial presence of ram air and, in response thereto, to send a signal to the actuator to move the closure structure to the opened position thereby increasing an open area of the shroud and thus reducing a load on the electric motor.

In accordance with another aspect of the invention, a method is provided for reducing a load of an electric motor which drives a fan of an engine cooling module. The engine cooling module has a shroud and a fan is coupled to the shroud. The shroud has a fan opening in a wall thereof to permit air moved by the fan to pass through the shroud. The shroud also has at least one additional opening in the wall thereof generally adjacent to the fan opening to permit air to pass though the shroud. Closure structure is associated with the additional opening and is movable to prevent and permit air flow through the additional opening. The method includes mounting the cooling module adjacent to a radiator in a vehicle. An actuator is provided to actuate the closure structure to move the closure structure from a closed position, covering the additional opening, to an opened position, substantially uncovering the additional opening. The fan is operated to move air through the radiator. Ram air is detected at the shroud and as soon as ram air is detected, the actuator is controlled to move the closure structure to the opened position thereby increasing an open area of the shroud and thus reducing a load on the electric motor.

Other objects, features and characteristics of the present invention, as well as the methods of operation and the functions of the related elements of the structure, the combination of parts and economics of manufacture will become more apparent upon consideration of the following detailed description and appended claims with reference to the accompanying drawings, all of which form a part of this specification.

BRIEF DESCRIPTION OF THE DRAWINGS

The invention will be better understood from the following detailed description of the preferred embodiments thereof, taken in conjunction with the accompanying drawings, wherein like reference numerals refer to like parts, in which.

DETAILED DESCRIPTION OF THE PREFERRED EMBODIMENT

Figure 1:
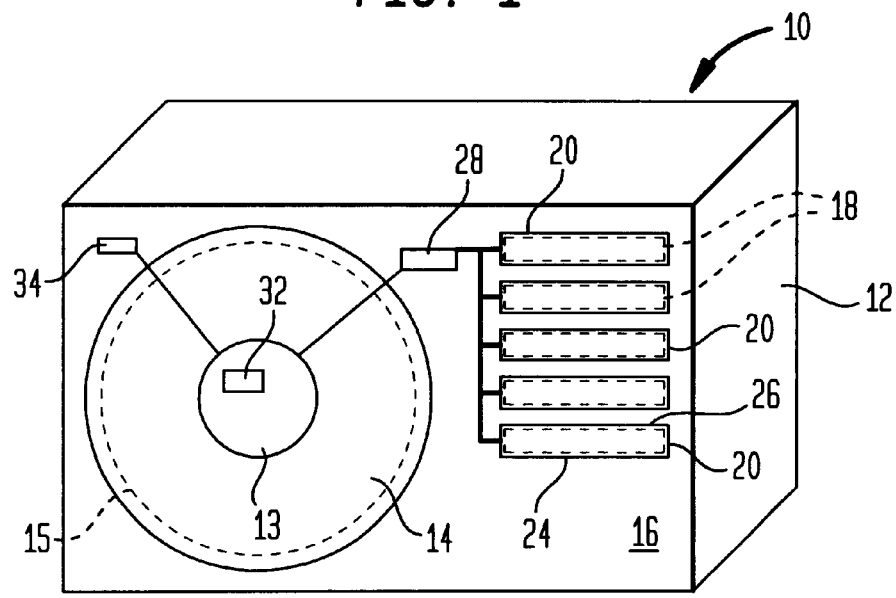
FIG. 1 is a schematic illustration of a cooling module provided in accordance with the principles of the present invention.
Figure 2:
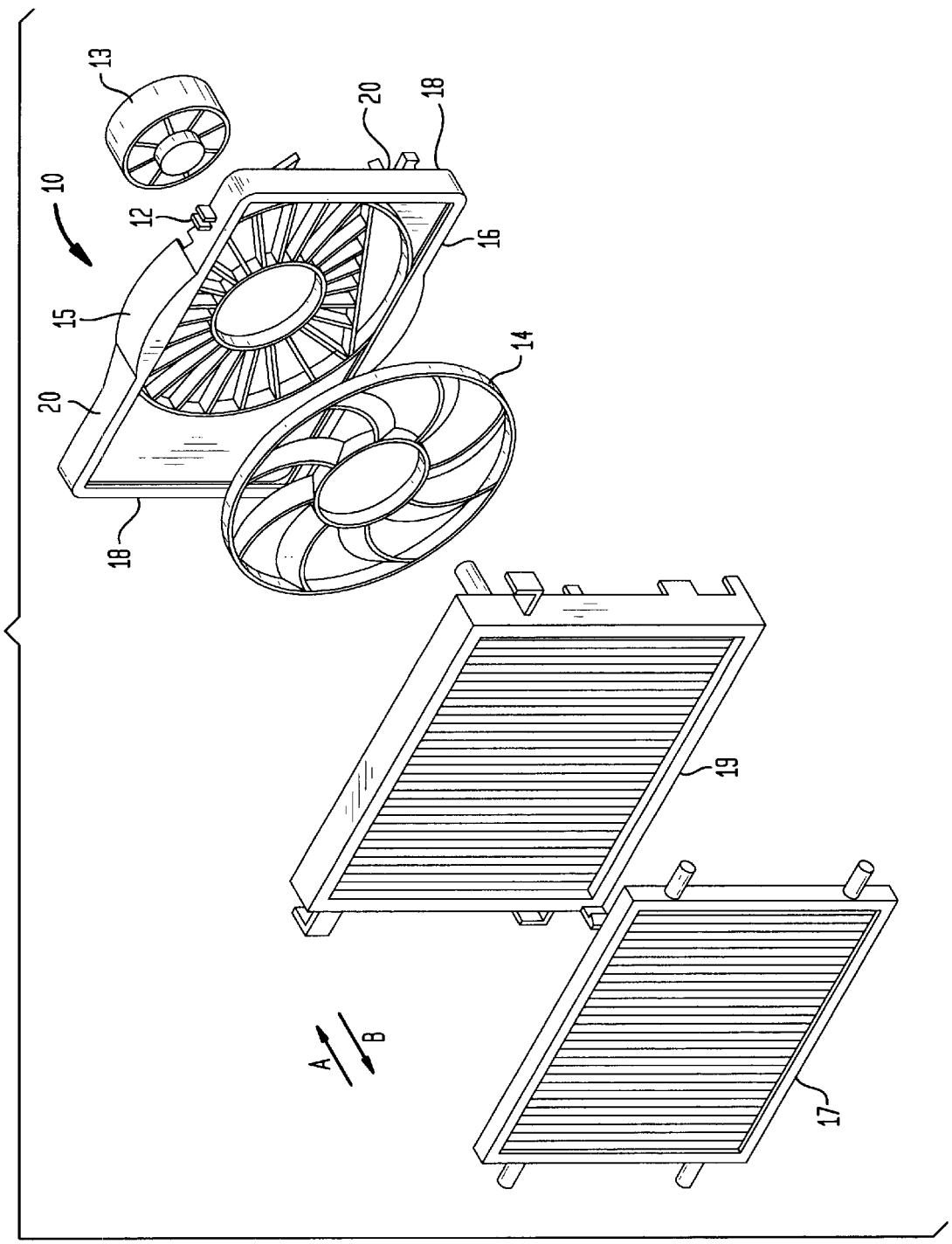
FIG. 2 is a perspective view of the cooling module of FIG. 1 associated with a radiator and a condenser.

With reference to FIGS. 1 and 2, an engine cooling module, generally indicated at 10, is shown in accordance with the principles of the present invention. The module includes a shroud 12, a fan 14 carried by shroud 12, and an electric motor 13 to drive the fan 14. As shown in FIG. 2, the shroud 12 has a fan opening 15 in a wall 16 to permit air, moved by the fan, to pass through the shroud 12. The cooling module 10 is constructed and arranged to be disposed downstream or upstream of a condenser 17 and a radiator 19 of a vehicle. The direction of air flow is shown by arrow A or B. In the disclosed embodiment, at least one opening 8 (a plurality of openings shown) is also provided through the wall 16 of the shroud 12 generally adjacent to the fan opening 15 to permit air to pass through the shroud 12. Movable closure structure 20 is provided to close or cover an associated opening 18. In the embodiment of FIG. 1, each closure structure 20 is in the form of a flapper door. Each flapper door is a plate 24 mounted via a hinged connection 26 with respect to the shroud 12. Although the openings 18 and flapper doors are shown to be of rectangular shape, other shapes are contemplated, such as square, trapezoidal, etc.

Flapper doors are used in engine cooling modules to reduce shroud resistance under ram air conditions and thus lead to power savings. At idle and low vehicle speeds, the shroud resistance is minimal. Ram air conditions typically occur at vehicle speeds of 80 kilometers per hour (kph) and higher. Generally, the flapper doors tend to be balanced to open only partially when ram air is present due to the weight of each door biasing the door to the closed position. Only when ram air increases due to an increase in vehicle speed, does the door open fully.

The invention provides automatic flapper door actuation at low ram pressure. In the embodiment of FIG. 1, the flapper doors 20 are joined together via a linkage 22 which is operatively associated with an actuator 28.

Figure 3:
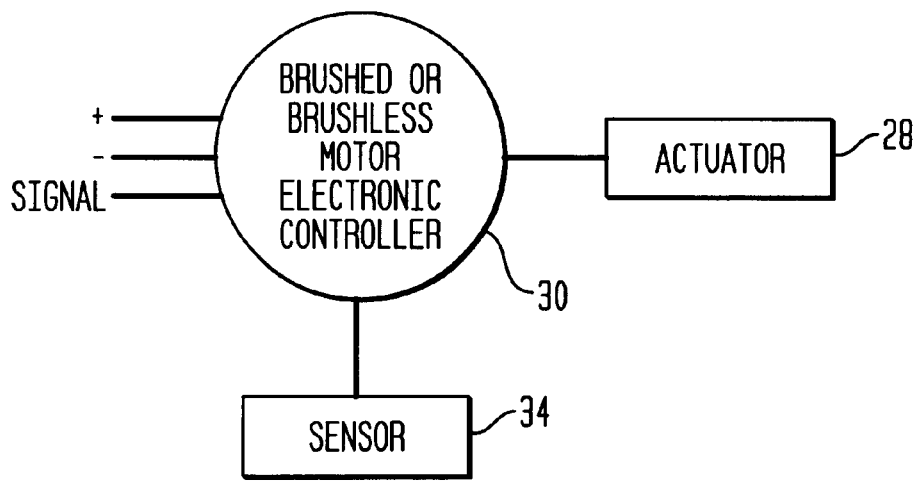
FIG. 3 is a block diagram of a motor microprocessor for controlling an actuator of the invention.
Figure 4:
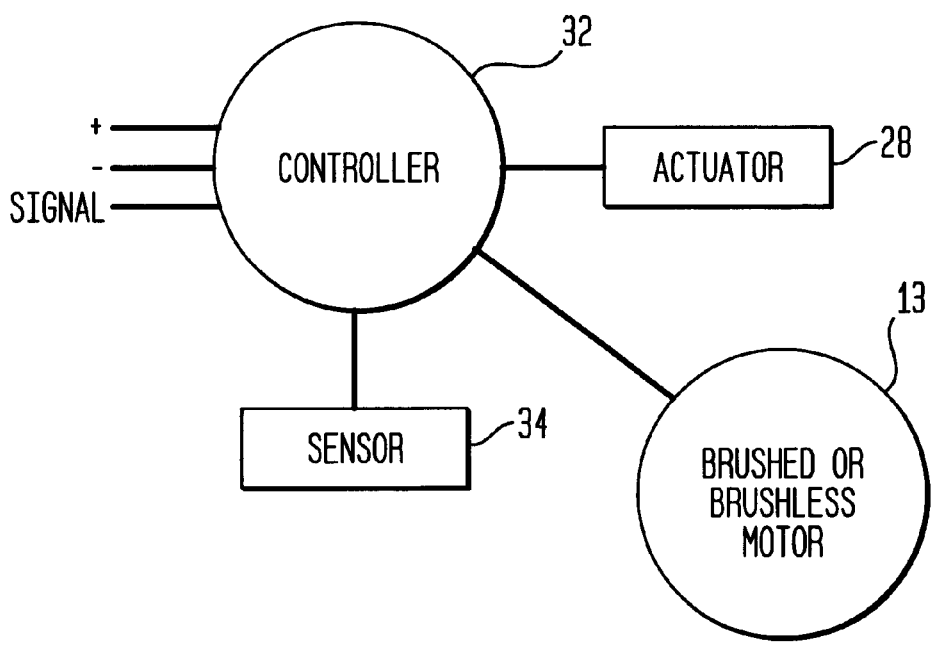
FIG. 4 is a block diagram of a controller for controlling an actuator of the invention.

The flapper door arrangement is automated so that the flapper doors 20 can be moved from a closed position covering the openings 18 to a fully opened position uncovering the openings 18. The flapper doors 20 are moved to the opened position to fully or at least substantially uncover the openings 18 under a small differential pressure, in particular, as soon as a small amount of ram air is detected. Actuation of the linkage 22 and thus the flapper doors 20 can be accomplished in a variety of ways. For example, the actuator 28 can be piezoelectric device, a small electric motor, shape memory alloy actuator, or vacuum assisted device to move the linkage 22. Control of the actuator 28 can be performed electronically by the brushless motor 13 as shown in FIG. 3 or a brush type motor with electronic control. Alternatively, the actuator 28 can be controlled by a separate controller 32 (FIG. 4) or other electronic device of the engine cooling module 10.

A sensor 34 is used to detect small amounts of ram air. In the embodiment, the sensor 34 is a pressure sensor preferably mounted on the shroud 12 which, upon detecting the presence of ram air, sends a signal to an electronic controller 30 or controller 32. Upon receiving the signal which indicates the initial presence of ram air, the electronic controller 30 sends a signal to the actuator 28 to cause the actuator to fully open the flapper doors 20, thereby reducing motor requirements as explained in more detail below.

Figure 5:
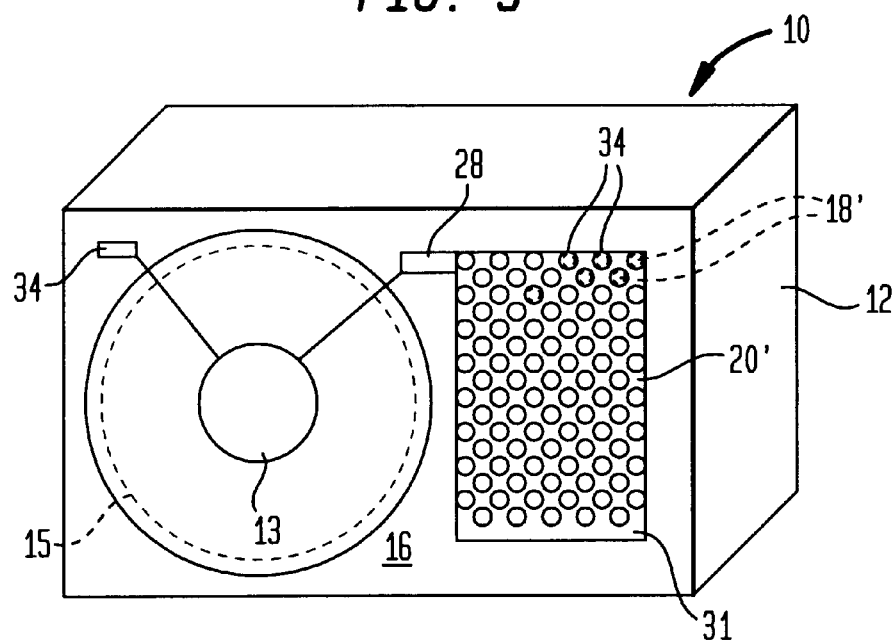
FIG. 5 is a schematic illustration of a cooling module provided in accordance with a second embodiment of the invention.

With reference to FIG. 5, a second embodiment of the closure structure 20 is shown. A plurality of openings 18' are provided in the wall 16 of shroud 12 and the closure structure 20' comprises a sheet 31 having holes 34 which match the openings 18' in the shroud 12 when aligned therewith. When the closure structure 20' is moved to a closed position, the openings 18' and holes 34 are not aligned and the openings 18' are thus closed by the non-perforated portions of the sheet 31. The closure structure 20' is controlled by the actuator 28. It can be appreciated that the sheet 31 of the closure structure 20' can be moved by vertical or horizontal sliding, or by rotation to prevent and permit air to pass through the openings 18'. Of course, the openings 18' and holes 34 can be of any shape.

The closure structure can also be in the form of vertical vanes, shutters, or membranes. Instead of using sensor 34 to detect ram air conditions, an algorithm can be used to control the closure structure 20 and 20' based on vehicle speed.

In accordance with the invention, the closure structure 20 and 20' is used in engine cooling modules to reduce shroud resistance under ram air conditions thus reducing the load on the electric motor 13. The resulting reduction in shroud resistance can lead to significant power savings. Since the fan itself is acting as a blockage, the flapper doors provide a less resistive path for the air to travel, by increasing the open area of the shroud. Size, location, and number of flapper doors are important when trying to minimize shroud resistance.

To illustrate the power benefits of using flapper doors, a test case is provided below where a cooling module was modified to include a different number of flapper doors. Tests were conducted using a cooling module having a single 390 mm fan.

Results

Airflow requirements for an engine are based vehicle speed. For example, a 80 kilometer per hour (kph) load requirement for a particular engine, onto which the single fan module was mounted, is 60 $mm^3$/min. Initial testing indicated that the module was only delivering 52 $mm^3$/min at the 12.7 V limit for this point. From the restriction data provided, it was possible to extract the vehicle alone (no heat exchangers or shroud) restriction curve. Through testing the module on the radiator and condenser, and obtaining a system curve, it was thus possible to accurately estimate the airflow that would be achieved when the module and heat exchangers were placed in the vehicle, i.e., where system curve intersects vehicle curve. This method of testing accounts fully for the additional losses that occur when the module is put on the heat exchangers ("proximity loss"). The required loadpoint for the system test in order for the module to deliver the required 60 $mm^3$/min in a vehicle was 1 $m^3$/s at −119 Pa. To achieve 1 $m^3$/s, a single 390 mm cooling module requires a power of about 520 W. Improved performance could be achieved from the motor but the majority of the problem lay with the airflow characteristics of the module. All test data and restriction data presented is corrected to an air density of 1.2 $kg/m^3$.

A series of tests were carried out to evaluate the benefits of flapper doors at the 80kph loadpoint. A single fan module was constructed with the fan on the side of the module corresponding to the hot fluid side (passenger side) of the heat exchangers. Fourteen flapper doors were placed on the driver side. A series of system curves were run with this module (same motor used for all cases) on the heat exchangers for several different 390 mm fans and different flapper door options. Table 1 summarizes the results of this testing. In each case the motor voltage was set such that the 1 $m^3$/s, −119 Pa loadpoint was met. The increase in open shroud area is equal to following ratio:

Total Flapper Door Area/Fan Shroud Opening Area The diameter of the 390 mm shroud barrel is approximately 396 mm; hence the shroud opening area =$\pi/4$ * (396 mm)$^2$

TABLE 1

Flapper Door Module System Performance at 80 kph Loadpoint
Hot Side Mounted Fan

| Number of Flapper Doors | | 0 | 4 Large | 8 Large | 12 Large | 14 Large |
|---|---|---|---|---|---|---|
| Increase in Open Shroud Area | | 0% | 11% | 22% | 34% | 39% |
| Fan | | | | | | |
| 390F-A | Power Watts (W) | 555 | 404 | 318 | 266 | 245 |
| | Power Reduction Due to Flapper Doors | 0% | 27% | 43% | 52% | 56% |
| | Speed (rpm) | 3547 | 3193 | 2959 | 2787 | 2708 |
| 390F-B | Power (W) | 520 | 367 | 281 | 242 | 215 |
| | Power Reduction Due to Flapper Doors | 0% | 29% | 46% | 53% | 59% |
| | Speed (rpm) | 2461 | 2200 | 2019 | 1920 | 1845 |
| 390F-C | Power (W) | 602 | 430 | 334 | 281 | 252 |
| | Power Reduction Due to Flapper Doors | 0% | 29% | 45% | 53% | 58% |
| | Speed (rpm) | 3694 | 3291 | 3008 | 2821 | 321 |
| 390F-D | Power (W) | 587 | 412 | 328 | 268 | 258 |
| | Power Reduction Due to Flapper Doors | 0% | 30% | 44% | 54% | 56% |
| | Speed (rpm) | 3090 | 2765 | 2556 | 2384 | 2341 |
| 390F-E | Power (W) | 554 | 388 | 316 | 268 | 250 |
| | Power Reduction Due to Flapper Doors | 0% | 30% | 43% | 52% | 55% |
| | Speed (rpm) | 3239 | 2879 | 2693 | 2544 | 2478 |
| 382F-A | Power( W) | 554 | 400 | 314 | 263 | 238 |
| | Power Reduction Due to Flapper Doors | 0% | 28% | 43% | 53% | 57% |
| | Speed (rpm) | 2670 | 2412 | 2224 | 2099 | 2015 |
| 382F-B | Power (W) | 534 | 388 | 308 | 252 | 229 |
| | Power Reduction Due to Flapper Doors | 0% | 27% | 42% | 53% | 57% |
| | Speed (rpm) | 2547 | 2295 | 2122 | 1922 | 1927 |

Centre Mounted Fan

| Number of Flapper Doors | | 0 | 7 Lg, 3 Sm | 11 Lg, 3 Sm |
|---|---|---|---|---|
| Increase in Open Shroud Area | | 0% | 26% | 37% |
| Fan | | | | |
| 390F-B | Power (W) | 446 | 292 | 267 |
| | Power Reduction Due to Flapper Doors | 0% | 34% | 40% |
| | Speed (rpm) | 2271 | 1989 | 1922 |

Figure 6:
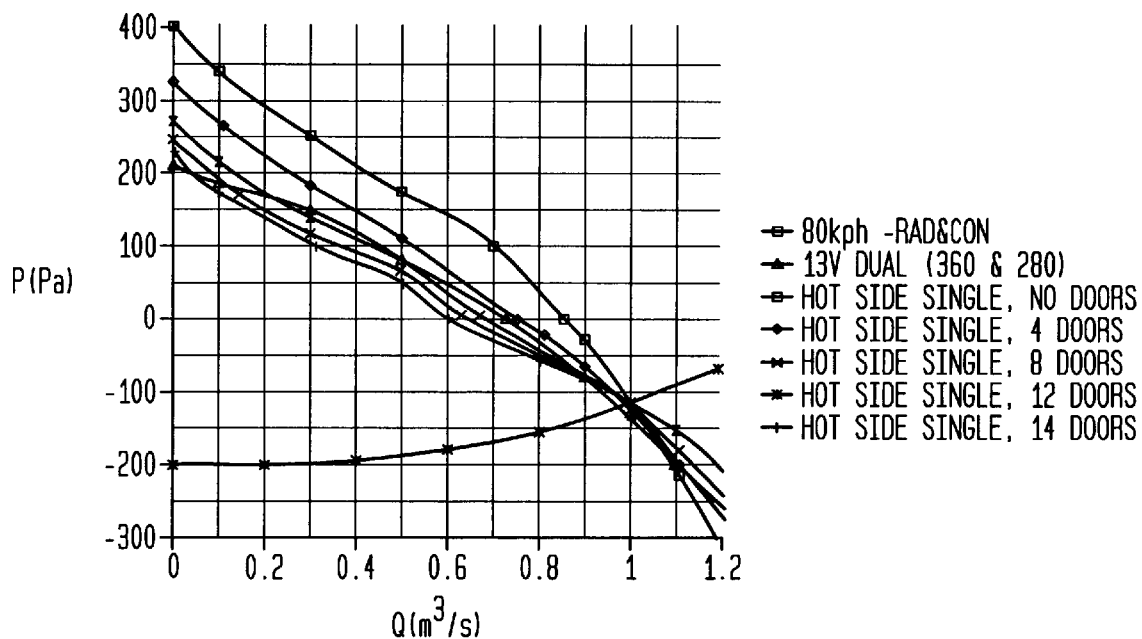
FIG. 6 shows system curves for a hot side mounted single 390 mm fan module.
Figure 7:
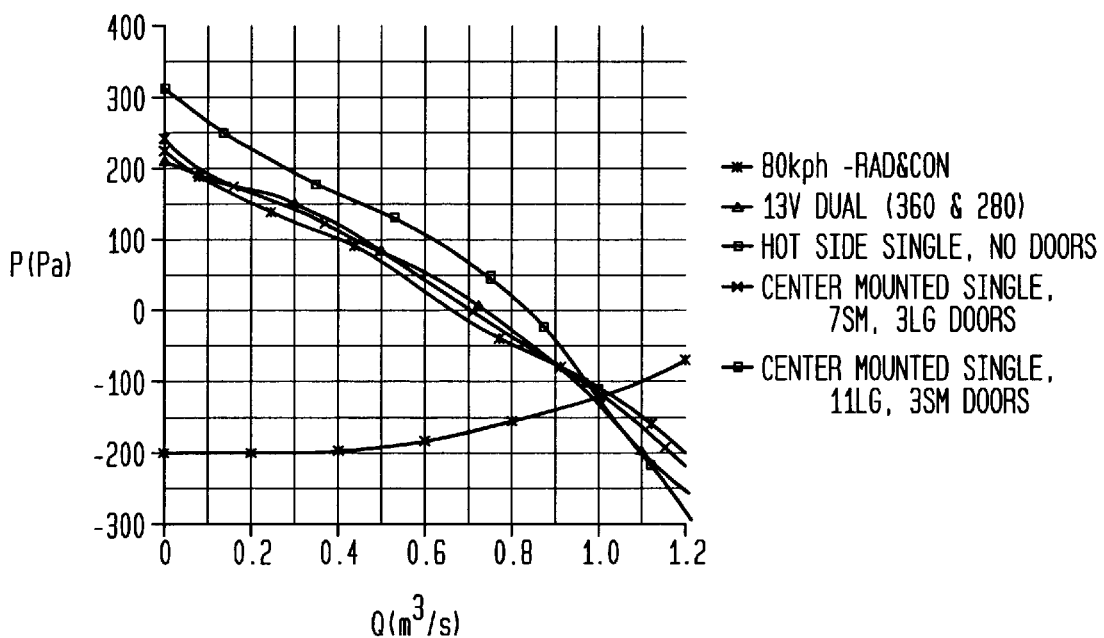
FIG. 7 shows system curves for a centrally mounted single 390 mm fan module.
Figure 8:
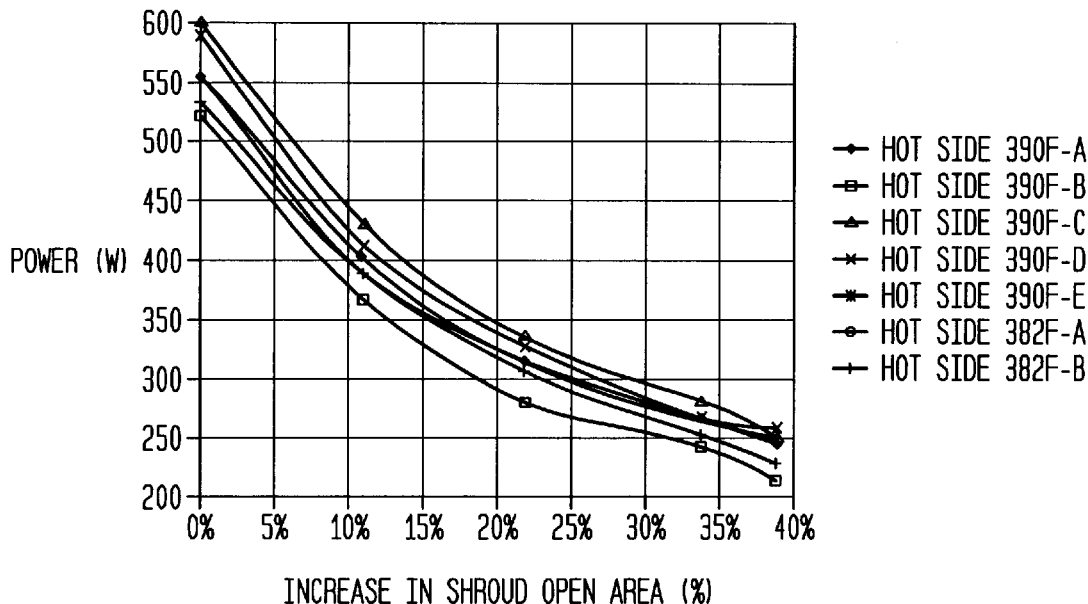
FIG. 8 shows electrical power requirements for a hot side mounted single 390 mm fan module verses open shroud area.
Figure 9:
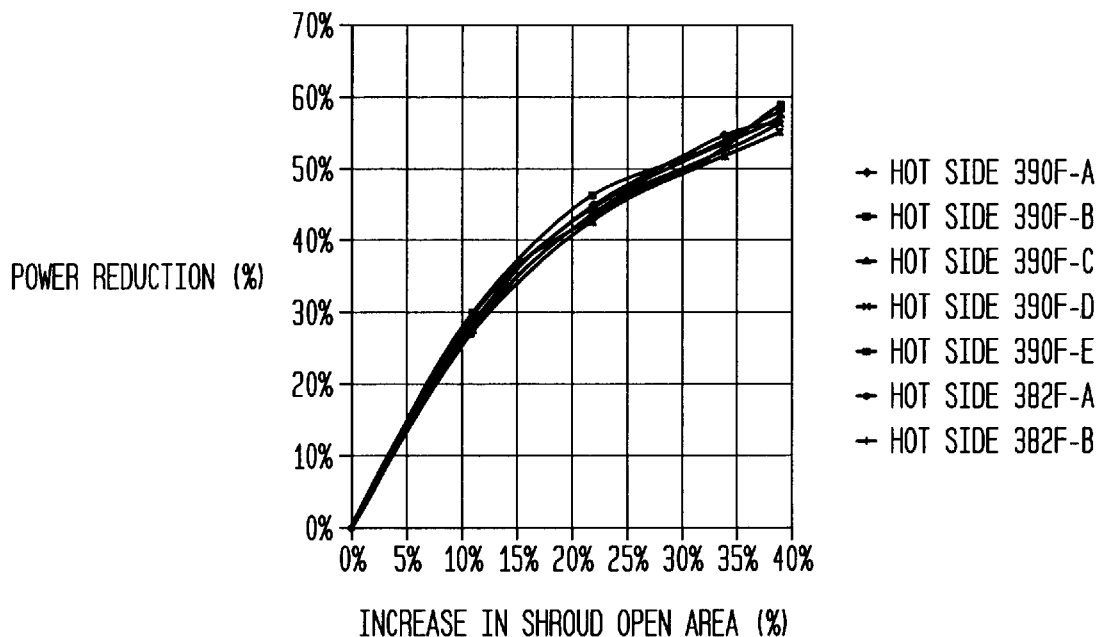
FIG. 9 shows power savings for the hot side mounted single 390 mm fan module.

FIG. 6 shows the different system curves required to meet the 80kph loadpoint. The addition of flapper doors reduces the slope of these system curves. The addition of eight large flapper doors gives a system curve comparable in slope to a dual fan module. FIGS. 8 and 9 show the electrical power savings resulting from the use of flapper doors. It can bee seen from both the FIGS. 6–9 and Table 1 that significant power savings were achieved. The power saving vs. flapper door area curve shows diminishing returns as the number of doors is further increased. Careful consideration therefore has to be given to the performance benefits vs the additional shroud costs as more doors are added. The original 390F–B fan was the best performing (lowest power) fan in this module when compared to the alternative 390 & 382 mm fans hence a fan change was not a performance increasing option. FIG. 9 shows that the power savings are independent of the fan used (allowing for slight variations due to the different motor efficiencies at each fan's speed/torque).

Figure 10:
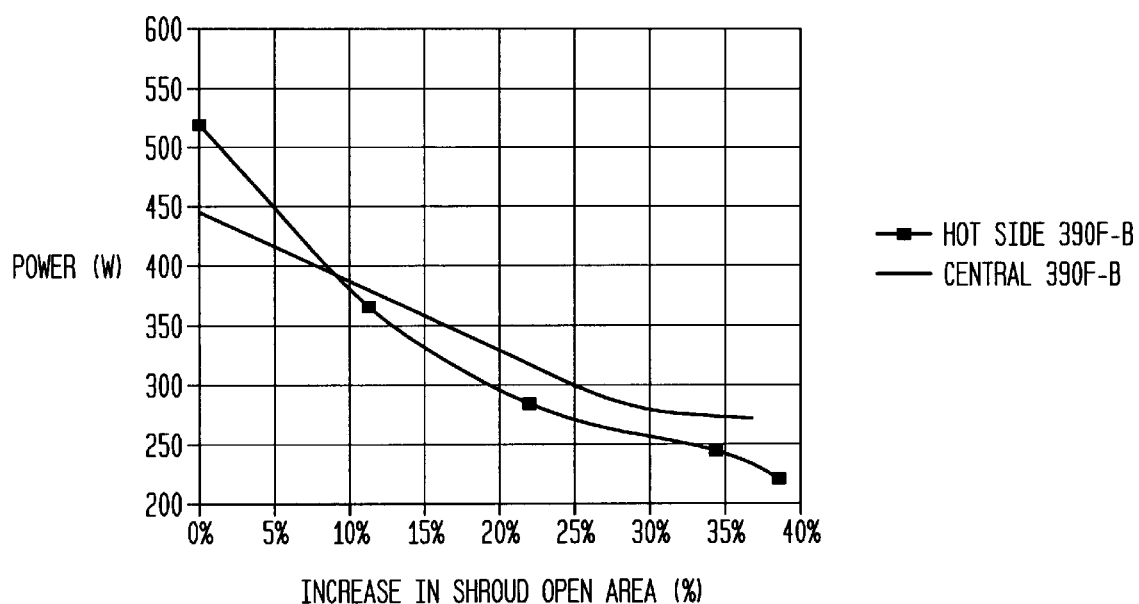
FIG. 10 shows power comparison for single 390 mm fan modules.
Figure 11:
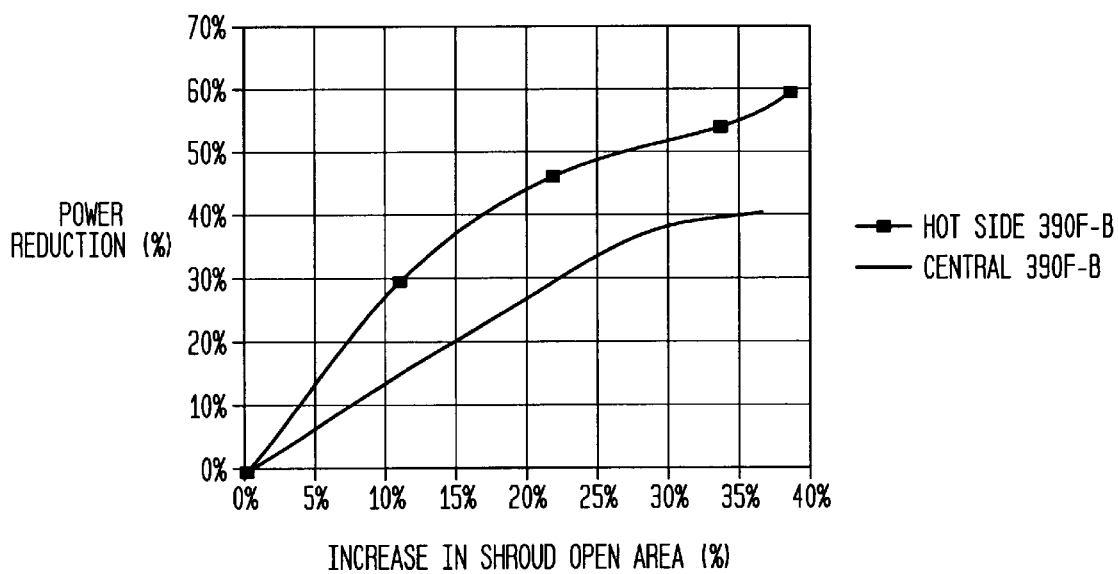
FIG. 11 shows power saving comparisons for single 390 mm fan modules.

Table 1 also contains the results from similar system tests on a centrally mounted fan module for the 390F–B fan only. Again significant power savings were achieved through the addition of flapper doors. FIG. 7 shows the system curves required to meet the 80 kph loadpoint and FIGS. 10 and 11 show the electrical power requirements and power savings. Seven large and three small flapper doors gives a system curve of similar slope to a dual fan module. The centrally mounted fan module is a more efficient module without flapper doors as can be seen from FIG. 10, i.e., lower power at 0% area increase. The power savings that are obtained through the addition of flapper doors may not be as great due to the more efficient original shroud. Another factor affecting the flapper door power savings for the centrally mounted fan module is that, unlike the hot side module, the flapper doors are on either side of the fan and not clustered together all on one side which may be of benefit. At 80kph with eight large flapper doors, the hot side mounted fan module required 281 W and the equivalent centrally mounted fan module (7 large and 3 small flapper doors) needed 292 W.

An improved motor design was produced for the centrally mounted module in light of this testing. With 7 large and 3 small flapper doors the power requirement at the 80kph loadpoint was further reduced to 258 W. A dual fan module required 274 W to achieve 58 mm$^3$/min (60 mm$^3$/min target).

Thus, significant power savings of up to 250 W were obtained at 80kph through the addition of flapper doors to the single 390 mm fan module. A centrally mounted module was produced with a new motor using this test data. The required 80kph loadpoint was met at 258 W of electrical power as opposed to the 446 W required for the original doorless module. This module was tested and the airflow achieved on the vehicle at the specified 12.7 V limit exceeded the required target.

In instances where a single fan module is required to met a high flow ram air loadpoint the use of flapper doors can significantly reduce electrical power requirements by minimizing energy needed to bring design cooling flow rates through the radiator.

Figure 12:
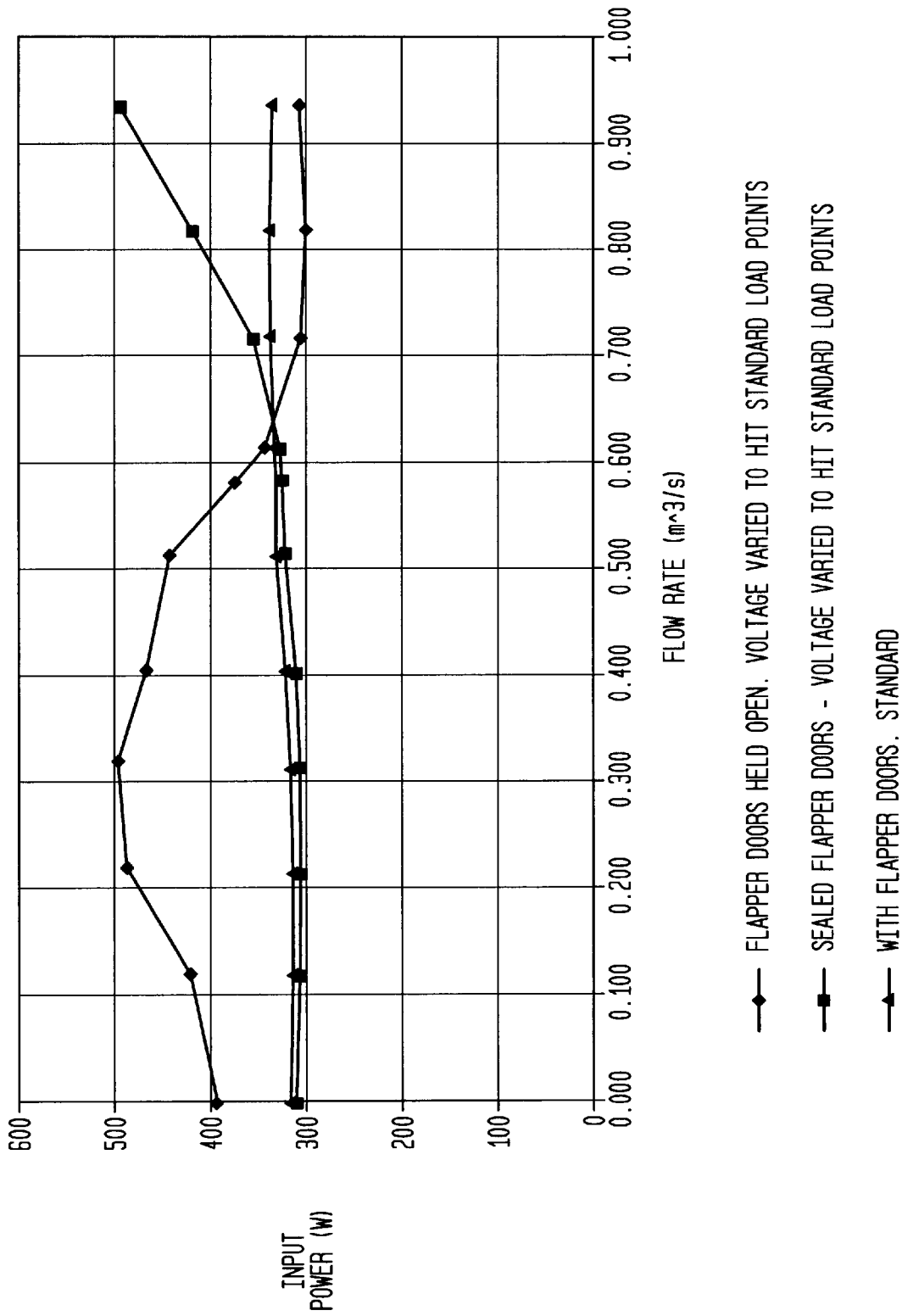
FIG. 12 is a graph of power vs. flow for cooling modules having flapper doors.

FIG. 12 shows that if the flapper doors are held fully open as soon as ram air is detected, a motor power savings of about 30 watts is achieved. This equates to a mileage savings of about 0.122 mpg.

The foregoing preferred embodiments have been shown and described for the purposes of illustrating the structural and functional principles of the present invention, as well as illustrating the methods of employing the preferred embodiments and are subject to change without departing from such principles. Therefore, this invention includes all modifications encompassed within the spirit of the following claims.

What is claimed is:

1. A method of reducing a load of an electric motor which drives a fan of an engine cooling module, the engine cooling module having a shroud, the fan being coupled to the shroud, the shroud having a fan opening in a wall thereof to permit air moved by the fan to pass through the shroud, the shroud having at least one additional opening in the wall thereof generally adjacent to the fan opening to permit air to pass through the shroud, closure structure is associated with the additional opening and is movable to prevent and permit air flow through the additional opening, method including:

mounting the cooling module adjacent to a radiator in a vehicle, providing an actuator to actuate the closure structure to move the closure structure from a closed position, covering the additional opening, to an opened position, substantially uncovering the additional opening, operating the fan to move air through the radiator, detecting ram air at the shroud, and as soon as ram air is detected, controlling the actuator to move the closure structure to the opened position thereby increasing an open area of the shroud and thus reducing a load on the electric motor.

2. The method of claim 1, wherein a controller and a sensor are provided, the sensor detecting an initial presence of ram air and sending a ram air signal to the controller, the controller sending a control signal to the actuator in response to the ram air signal to actuate the actuator.

3. The method of claim 2, wherein the controller is within an electronic controller used to control an engine cooling motor.

4. The method of claim 2, wherein the controller is separate from the electric motor.

5. The method of claim 2, wherein the controller is pneumatically, hydraulically or mechanically separate from the electric motor.

6. The method of claim 1, wherein a plurality of additional openings are provided in the shroud.

7. The method of claim 6, wherein the closure structure comprises a flapper door associated with each opening and mounted to the shroud via a hinged connection.

8. The method of claim 7, wherein moving the closure structure includes using a linkage coupled with the actuator and to each flapper door, whereby movement of the actuator moves the linkage and thus each flapper door generally simultaneously.

9. The method of claim 6, wherein the closure structure comprises a sheet having holes therethrough which align with the additional openings when the closure structure is in the opened position, the sheet being constructed and arranged to cover the additional openings when in the closed position thereof.

10. The method of claim 8, wherein the actuator is one of a piezoelectric device, an electric motor, a shape memory alloy and a vacuum assisted device.

11. An engine cooling module comprising:

a shroud having at least one fan opening in a wall thereof, and at least one additional opening in the wall generally adjacent to the fan opening to permit air to pass through the shroud, at least one fan coupled to the shroud so as to be adjacent to the at least one fan opening to permit air moved by the fan to pass through the shroud, a primary drive device to drive the fan, closure structure associated with the additional opening and movable to prevent and permit air flow through the additional opening, an actuator constructed and arranged to actuate the closure structure to move the closure structure from a closed position, covering the additional opening, to an opened position, substantially uncovering the additional opening, a sensor constructed and arranged to detect ram air at the shroud, and a controller constructed and arranged to receive a signal from the sensor indicating the initial presence of ram air and, in response thereto, to send a signal to the actuator to move the closure structure to the opened position thereby increasing an open area of the shroud and thus reducing a load on the primary drive device.

12. The engine cooling module of claim 11, wherein the sensor is a pressure sensor.

13. The engine cooling module of claim 11, wherein the primary drive device is an electric motor.

14. The engine cooling module of claim 13, wherein the controller is an electronic controller of the electric motor.

15. The engine cooling module of claim 13, wherein the controller is separate from the electric motor.

16. The engine cooling module of claim 11, wherein a plurality of additional openings are provided in the shroud.

17. The engine cooling module of claim 16, wherein the closure structure comprises a flapper door associated with each additional opening and mounted to the shroud via a hinged connection.

18. The engine cooling module of claim 17, further including a linkage coupled with the actuator and to each flapper door, whereby movement of the actuator moves the linkage and thus each flapper door generally simultaneously.

19. The engine cooling module of claim 16, wherein the closure structure comprises a sheet having holes therethrough which align with the additional openings when the closure structure is in the opened position, the sheet being constructed and arranged to cover the additional openings when in the closed position thereof.

20. The engine cooling module of claim 11, wherein the actuator is one of a piezoelectric device, an electric motor, a shape memory alloy and a vacuum assisted device.

21. An engine cooling module comprising:

a shroud having at least one fan opening in a wall thereof, and at least one additional opening in the wall thereof generally adjacent to the fan opening to permit air to pass through the shroud, a fan coupled to the shroud so as to be adjacent to the fan opening to permit air moved by the fan to pass through the shroud, a primary drive device to drive the fan, closure means, associated with the additional opening, for preventing and permitting air flow through the additional opening, means for actuating the closure means to move the closure means from a closed position, covering the additional opening, to an opened position, substantially uncovering the additional opening, means for detecting ram air at the shroud, and controlling means for receiving a signal from the detecting means indicating the initial presence of ram air and, in response thereto, for sending a signal to the actuating means to move the closure means to the opened position thereby increasing an open area of the shroud and thus reducing a load on the primary drive device.

22. The engine cooling module of claim 21, wherein the detecting means is a pressure sensor.

23. The engine cooling module of claim 21, wherein the primary drive device is an electric motor.

24. The engine cooling module of claim 23, wherein the controlling means is an electronic controller of the electric motor.

25. The engine cooling module of claim 23, wherein the controlling means is a controller, separate from the electric motor.

26. The engine cooling module of claim 21, wherein a plurality of additional openings are provided in the shroud and a closure means is associated with each additional opening.

27. The engine cooling module of claim 26, further including a means for linking each closure structure with the actuating means such that movement of the actuating means moves the each closure means generally simultaneously.

28. The engine cooling module of claim 27, wherein each closure means comprises a flapper door mounted to the shroud via a hinged connection.

29. The engine cooling module of claim 21, wherein a plurality of additional openings are provided in the shroud and the closure structure comprises a sheet having holes therethrough which align with the additional openings when the closure structure is in the opened position, the sheet being constructed and arranged to cover the additional openings when in the closed position thereof.

30. The method of claim 1, wherein the step of detecting ram air includes using a pressure sensor.

* * * * *